United States Patent [19]

Waldern

[11] Patent Number: 4,732,932

[45] Date of Patent: Mar. 22, 1988

[54] CURABLE ORGANOPOLYSILOXANE COMPOSITIONS WITH IMPROVED ADHESION

[75] Inventor: Alan M. Waldern, Brussels, Belgium

[73] Assignee: Dow Corning S.A., Brussels, Belgium

[21] Appl. No.: 939,321

[22] Filed: Dec. 8, 1986

[51] Int. Cl.$^4$ ............................................. C08L 83/04
[52] U.S. Cl. ..................................... 524/862; 524/264; 524/265; 524/730; 528/15; 528/31; 528/32; 525/478
[58] Field of Search ............................ 528/15, 31, 32; 525/478; 524/264, 265, 730, 862

[56] References Cited

U.S. PATENT DOCUMENTS 4,426,240  1/1984  Louis et al. ........................... 528/15
4,605,722  8/1986  Suzuki .................................. 528/15

FOREIGN PATENT DOCUMENTS 1561763  3/1980  United Kingdom .
1577511  10/1980  United Kingdom .

Primary Examiner—Melvyn I. Marquis
Attorney, Agent, or Firm—Robert Spector

[57] ABSTRACT

Organopolysiloxane compositions comprising a polyorganosiloxane having olefinic unsaturation, an organohydrogen polysiloxane and a catalyst, exhibit improved adhesion to a number of substrates when it also comprises an organosilane of the general formula $R'(RO)_2SiR''$, wherein R denotes a monovalent hydrocarbon group, R' denotes an aliphatically unsaturated hydrocarbon or hydrocarbonoxy group and R" denotes an epoxy functional group. The organopolysiloxane compositions also exhibit reduced thixotropy over prior art compositions especially when a reinforcing silica filler is also present.

10 Claims, No Drawings

CURABLE ORGANOPOLYSILOXANE COMPOSITIONS WITH IMPROVED ADHESION

This invention relates to curable organopolysiloxane compositions which have improved adhesion to substrates.

Organopolysiloxane compositions which are curable to elastomers are well known in the art. In one type of such compositions the curing mechanism involves the reaction of hydroxy-endblocked polysiloxanes with alkoxysilanes in the presence of a metal carboxylate as catalyst. Another type is based on acyloxy terminated polysiloxanes, the composition curing on exposure to moisture. The type of elastomer-forming composition with which this invention is concerned, is that comprising an organopolysiloxane containing olefinically unsaturated organic groups and an organopolysiloxane containing silicon-bonded hydrogen atoms. Such compositions cure to an elastomer in the presence of a catalyst which comprises a group VIII metal or a compound or complex thereof. Usually the catalyst is a compound or complex of platinum, although other metals, e.g. rhodium and palladium are operative.

It is well known that the adhesion of such organopolysiloxane compositions to a number of substrates is generally not satisfactory and several solutions have been proposed. One such solution is the application of a primer to that substrate, prior to the application of the organopolysiloxane composition. Because two separate operations are required and usually the primer must be allowed to dry before the organopolysiloxane composition may be applied, this solution is not very attractive. Another solution which has been proposed is the incorporation of an adhesion promoter into the organopolysiloxane composition prior to application of the composition to the substrate.

Patent Specification G.B. No. 1 561 763 for example provides a curable organopolysiloxane composition comprising a mixture of (A) certain organopolysiloxanes containing at least two alkenyl groups, (B) certain organopolysiloxanes containing at least two hydrogen atoms bonded to silicon atoms, (C) a catalyst, and (D) an organosilicon compound having at least one $Q(R''O)_2Si$-group and at least one $C_1$-$C_6$ alkenyl group or at least one hydrogen atom bonded to silicon atoms which are in the same molecule, wherein Q is a monovalent hydrocarbon, halogenated hydrocarbon, ether oxygen atom containing hydrocarbon or hydroxyl group containing hydrocarbon radical containing at least one epoxy group and R'' is a substituted or unsubstituted monovalent hydrocarbon radical. The composition as described in the above patent specification is said to have enhanced adhesion to various substrates.

Patent specification G.B. No. 1 577 511 provides a composition comprising a product obtained by mixing (A) certain vinyl-containing polyorganosiloxanes having an average of about two silicon-bonded vinyl radicals per molecule, (B) certain organosilicon compounds having an average of at least 3 silicon-bonded hydrogen atoms per organosilicon compound molecule and having no more than one silicon bonded hydrogen atom on any one silicon atom, (C) a platinum catalyst, (D) certain polysiloxanes having an average of at least one silicon-bonded hydroxyl radical per molecule and an average of at least one silicon-bonded vinyl radical per molecule, and (E) certain silanes having at least one epoxy-containing organic group, at least one silicon-bonded alkoxy group having less than 5 carbon atoms per group. This composition is stated to give improved adhesion properties when applied to substrates and heat cured.

However, it has also been found that in the presence of, for example, a fumed silica filler, adhesion promoter containing organopolysiloxane compositions according to the above patent specifications, exhibit thixotropic behaviour. This is not always advantageous, for example where a good levelling is required. It is particularly disadvantageous where large surfaces of materials, for example aluminium and certain plastics, need to be adhered to each other in such a way that a completely smooth surface is obtained. Thixotropic materials are likely to entrap air, which may cause unevenness when the organopolysiloxane composition has been cured.

It is an object of the present invention to provide an organopolysiloxane composition, curable to an elastomer, which gives improved adhesion to a variety of substrates and exhibits reduced thixotropy, and where the organopolysiloxane composition uses a curing system by which organopolysiloxanes containing olefinically unsaturated organic substituents, are reacted with organopolysiloxanes containing silicon-bonded hydrogen atoms.

According to the present invention there is provided an organopolysiloxane composition comprising (A) a polyorganosiloxane having per molecule on average at least two units of the general formula $Q_aQ'SiO_{3-a/2}$ any remaining units having the general formula $Q_bSiO_{4-b/2}$ wherein Q is selected from the group consisting of a monovalent hydrocarbon and a monovalent substituted hydrocarbon group having no more than 8 carbon atoms, Q' denotes an organic group having olefinic unsaturation, a has a value of from 1 to 2 and b has a value of from 0 to 3, and at least 80% of the Q groups are methyl groups, (B) an organohydrogen polysiloxane having on average at least two silicon-bonded hydrogen atoms per molecule, any remaining substituents of the silicon atoms being a monovalent hydrocarbon group having no more than 8 carbon atoms, at least 50% of said remaining substituents being methyl groups, (C) a catalyst selected from a group consisting of a group VIII metal, a compound thereof and a complex thereof in an amount sufficient to catalyse the reaction between (A) and (B), and (D) an organosilane having the general formula

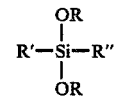

where R is a monovalent hydrocarbon group, having no more than 8 carbon atoms and which may contain ether oxygen atoms, R' is chosen from the group consisting of a hydrocarbon and a hydrocarbonoxy group having from 2 to 5 carbon atoms and having aliphatic unsaturation, and R'' is selected from the group consisting of a monovalent hydrocarbon group, a hydrocarbonoxy group, a halogenated hydrocarbon group, a halogenated hydrocarbonoxy group, a hydrocarbon group which contains oxygen in the form of an ether linkage, a hydrocarbon group which contains oxygen in the form of a hydroxyl group, a hydrocarbonoxy group which contains oxygen in the form of an ether linkage and a hydrocarbonoxy group which contains oxygen in the form of a hydroxyl group, said R" containing an epoxy group.

The polyorganosiloxanes (A) may vary from freely flowing liquids to highly viscous substances, those having a viscosity in the range from 0.2 to 50 Pa.s at 25° C. being preferred. They are well known in the art and may be homopolymers, copolymers or mixtures thereof, which comprise units of the general formula $Q_aQ'SiO_{3-a/2}$ and $Q_bSiO_{4-b/2}$, wherein Q denotes a monovalent hydrocarbon or substituted hydrocarbon group having no more than 8 carbon atoms, Q' denotes an organic group having olefinic unsaturation, a has a value of 1 or 2 and b has a value of 0, 1, 2 or 3. Polyorganosiloxanes (A) may be prepared by well-established techniques, for example of the equilibration of the appropriate cyclic siloxane(s) with an organodisiloxane. Subject to the presence of an average of at least two silicon-bonded organic groups having olefinic unsaturation per molecule, up to 1 percent of the total silicon atoms in the polyorganosiloxane may have such organic group attached thereto: and not more than one such organic group should be attached to any silicon atom. Such organic groups may be on terminal silicon atoms or pendant from silicon atoms in the polyorganosiloxane chain. Preferably the organic groups having olefinic unsaturation are vinyl groups. At least 80 percent of the remaining substituents in the polyorganosiloxane are methyl groups, any other substituents may be phenyl or 3,3,3-trifluoropropyl groups. Preferably, the proportion of any phenyl groups present should not exceed about 10% of the total number of organic substituents in the polyorganosiloxane. The polyorganosiloxane (A) may have triorganosiloxy end-blocking groups which may be, for example, trimethylsiloxy, dimethylvinylsiloxy, dimethylphenylsiloxy or methylphenylvinylsiloxy. The preferred polyorganosiloxanes (A) are those having on average two vinyl groups per molecule, each of the said vinyl groups being present in an end-blocking triorganosiloxy group, that is being attached to a terminal silicon atom. Examples of the preferred polyorganosiloxanes (A) are methylphenylvinylsiloxy-terminated polydimethylsiloxanes, dimethylvinylsiloxy-terminated polydimethylsiloxanes and dimethylvinylsiloxy-terminated copolymers of dimethyl siloxane and methylphenylsiloxane units.

The organohydrogensiloxanes (B) are also well-known in the art. They can be any organosiloxane having on average at least two silicon-bonded hydrogen atoms per molecule and wherein the remaining silicon-bonded substituents are monovalent hydrocarbon groups having no more than 8 carbon atoms. Preferably they are selected from alkyl groups having from 1 to 6 carbon atoms and phenyl groups. At least 50% of said remaining substituents are methyl groups. The organohydrogensiloxanes can be homopolymers, copolymers or mixtures thereof which comprise units such as $M_2SiO$, $M_3SiO_{\frac{1}{2}}$, $MHSiO$, $HSiO_{3/2}$, $MSiO_{3/2}$, $M_2HSiO_{\frac{1}{2}}$ and $SiO_2$ wherein M is as defined above for Q but preferably represents a $C_1$-$C_8$ alkyl or phenyl group and most preferably methyl. Specific examples of organohydrogen siloxanes (B) are copolymers of trimethylsiloxane units and methylhydrogensiloxane units, copolymers of trimethylsiloxane, dimethylsiloxane and methylhydrogensiloxane units, cyclic methylhydrogensiloxanes and copolymers of dimethylhydrogensiloxane units, dimethylsiloxane units and methylhydrogensiloxane units. The organohydrogensiloxanes preferably have at least 5 silicon-bonded hydrogen atoms per molecule and are most preferably copolymers of trimethylsiloxane units, methylhydrogensiloxane units and, optionally, dimethylsiloxane units having a viscosity of from about $1.5\times10^{-2}$ to about 0.5 Pa.s at 25° C.

The proportion of organohydrogensiloxane employed should be sufficient to provide at least 0.5 and up to 3 silicon-bonded hydrogen atoms per vinyl group in (A).

Component (C) of the compositions of this invention is a group VIII metal or a complex or compound thereof. Preferably component (C) is a platinum compound or complex. This component is effective in catalysing the reaction between the vinyl groups in (A) and the silicon-bonded hydrogen atoms in (B). The addition of SiH groups to unsaturated aliphatic groups is well known in the art of organosilicon chemistry as are a variety of platinum-based catalysts for the reaction. Such catalysts are well-documented in the art and include chloroplatinic acid, platinum acetylacetonate, complexes of platinous halides with unsaturated compounds such as ethylene, propylene, organovinylsiloxanes and styrene, hexamethyldiplatinum, $PtCl_2.PtCl_3$ and $Pt(CN)_3$. The preferred platinum catalysts are complexes of platinum compounds and vinyl siloxanes e.g. those formed by the reaction of chloroplatinic acid and divinyltetramethyl disiloxane. Sufficient of the catalyst should be employed to provide a homogenous and effective cure of the composition. The preferred proportion of platinum catalyst is usually that which will provide from about 1 to about 40 parts by weight of Pt per million parts by weight of (A) and (B).

Compositions comprising (A), (B) and (C) are well known in the art and are described in e.g. British Patent Specification Nos. 1 090 122, 1 141 868 and 1 409 223.

As component (D) there is employed an organosilane of the general formula

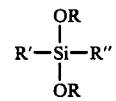

Herein R is a monovalent hydrocarbon radical having no more than 8 carbon atoms and which may contain ether oxygen atoms. R is preferably an alkyl, alkoxyalkyl or aryl group. Most preferably R is methyl or methoxyethyl. R' is an organic radical having from 2 to 5 carbon atoms and having aliphatic unsaturation. Examples of R' include alkenyl, alkynyl, alkenoxy and alkynoxy groups, for example vinyl, allyl, butenyl, pentenyl, allyloxy, butenoxy, pentenoxy and propargyl groups. R" is a monovalent hydrocarbon, hydrocarbonoxy, halogenated hydrocarbon or halogenated hydrocarbonoxy group, or a hydrocarbon or hydrocarbonoxy group containing oxygen in the form of an ether linkage or a hydroxyl group. R" contains an epoxy group. R" may have the general formula

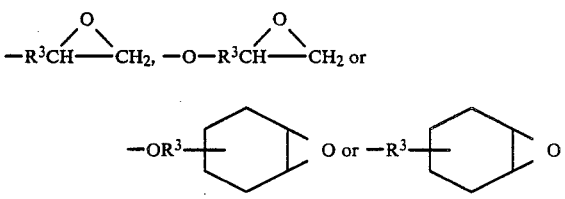

where $R^3$ is a divalent hydrocarbon group, halogenated hydrocarbon group or ether oxygen or hydroxyl containing hydrocarbon group. Examples of $R^3$ include methylene, ethylene, propylene, phenylene, chloroethylene,

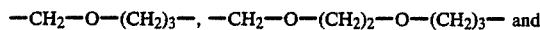—CH$_2$—O—(CH$_2$)$_3$—, —CH$_2$—O—(CH$_2$)$_2$—O—(CH$_2$)$_3$— and

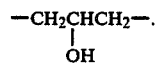
—CH$_2$CHCH$_2$—.
  |
  OH

Preferably R" has the formula

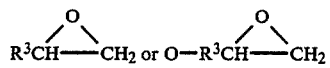
$$R^3CH\overset{O}{\diagup\diagdown}CH_2 \text{ or } O-R^3CH\overset{O}{\diagup\diagdown}CH_2$$

and most preferably $R^3$ is —CH$_2$O—(CH$_2$)$_3$— or —CH$_2$—. The organosilane (D) can be prepared by known techniques, for example equilibrating an epoxy functional trialkoxy silane with an alcohol of an aliphatically unsaturated C$_2$–C$_5$ hydrocarbon, for example allyl alcohol, or of a vinyl tri(alkoxyalkyoxy) silane with an epoxy alcohol in the presence of an equilibration catalyst, for example a titanium compound. From 0.5 to 5% by weight of the organosilane (D) based on the total composition may be used in the organopolysiloxane composition of the invention. Preferably from 0.5 to 2% by weight is used.

The curable organopolysiloxane compositions of this invention may also comprise other ingredients. Examples of extra additives are fillers, for example reinforcing silica fillers such as pyrogenically produced silica and precipitated silica, alumina, finely divided quartz, calcium carbonate, zinc oxide, titania and zirconium silicate, flame retardant additives, heat stabilising additives, pigments and solvents. Fillers which are added to the compositions of this invention are preferably treated with filler treating agents. Such agents are generally known in the art and include for example hexamethyldisilazane and methylhalogenosilanes. Up to about 50 percent of the total composition may be fillers, but preferably from 5 to 40 percent is used. The preferred filler is a reinforcing silica filler.

Curable organopolysiloxane compositions according to the invention show improved adhesion to various substrates, for example glass, metals and several plastic substrates. The compositions show no thixotropic effects when applied to substrates and are self-levelling. This gives the advantage that substrates having large surfaces can be adhered to each other without entrapping air, thus making it possible to obtain a smooth and even finish. This is particularly important where at least one of the substrates which needs to be adhered is flexible, for example metal foil.

The curable organopolysiloxane compositions of this invention are useful as heat curing adhesives for example in the electronics industry and in engineering, e.g. for structural bonding. They are also useful as self priming encapsulants e.g. for electronics. They can be supplied as two pack systems where the polyorganosiloxane (A) together with catalyst (C) may be packed in one part and the organohydrogen polysiloxane (B) in the other part possibly mixed with part of polyorganosiloxane (A). The component (D) may be added to either or both parts. Alternatively the organopolysiloxane compositions of the invention may be packaged in a single container. In this case it may be necessary to incorporate a cure inhibitor into the compositions. Such packaging techniques are known in the art.

The following examples in which the parts and percentages are expressed by weight, illustrate the invention.

An organopolysiloxane composition was prepared based on 628 parts of a polydimethylsiloxane having about 1.2% by weight vinyl groups which are bonded to silicon atoms, 27 parts of a methyl hydrogen polysiloxane having about 0.7% by weight H atoms, 340 parts of a ground quartz filler and 1.2 part of a Pt complex as catalyst. This composition was divided into 5 lots. To Lot A nothing was added and this was used as a standard composition. To Lot B was added 1% by weight based on the weight of the composition of an adhesion promotor B, based on G.B. No. 1 561 763 and obtained by reacting epoxy methoxy silane with a hydroxy terminated polymethylvinylsiloxane. To Lot C was added 1% by weight of an adhesion promoter C, based on G.B. No. 1 577 511 and obtained by mixing an epoxy-trimethoxysilane with a hydroxy endblocked polymethylvinylsiloxane. To Lot D was added 1% by weight of an adhesion promotor D according to this invention, which was obtained by equilibrating an epoxytrimethoxysilane (0.1 mole) with allyl alcohol (0.1 mole) in the presence of tetrabutyl titanate. To Lot E was added 1% by weight of an adhesion promoter E according to this invention, which was obtained by equilibrating vinyl tri(methoxyethoxy)silane (0.1 mole) with 2,3 epoxy-1-propanol (0.1 mole). Adhesion promotor D is believed to have the structure

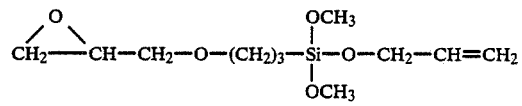
$$CH_2\overset{O}{\diagup\diagdown}CH-CH_2-O-(CH_2)_3-\underset{\underset{OCH_3}{|}}{\overset{\overset{OCH_3}{|}}{Si}}-O-CH_2-CH=CH_2$$

and adhesion promotor E is believed to have the structure

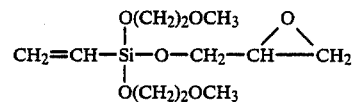
$$CH_2=CH-\underset{\underset{O(CH_2)_2OCH_3}{|}}{\overset{\overset{O(CH_2)_2OCH_3}{|}}{Si}}-O-CH_2-CH\overset{O}{\diagup\diagdown}CH_2$$

Each of lots A, B, C, D and E were tested in the following way:
1. Adhesion force was measured by the lap shear strength (ASTM 1002) on aluminium panels after curing one hour at 150° C.
2. Thixotropy was measured by judging the surface flatness of a sample left 72 hours in an aluminium disk of 5 cm diameter.

The following results were obtained:

|  | Test 1 | Test 2 |
|---|---|---|
| Lot A | 0.705 MPa | no thixotropy |
| Lot B | 3.14 MPa | considerable thixotropy |
| Lot C | 3.53 MPa | slightly less than Lot B |
| Lot D | 3.69 MPa | no thixotropy |
| Lot E | 3.16 MPa | no thixotropy |

The results of these tests show that the adhesion of compositions according to the present invention (Lots D and E) to aluminium was improved over the standard composition (Lot A), whilst the amount of thixotropy exhibited by the composition according to the invention That which is claimed is:

1. An organopolysiloxane composition comprising (A) a polyorganosiloxane having per molecule on average at least two units of the general formula $Q_aQ'SiO_{3-a/2}$ any remaining units having the general formula $Q_bSiO_{4-b/2}$ wherein Q is selected from the group consisting of a monovalent hydrocarbon and a monovalent substituted hydrocarbon group having no more than 8 carbon atoms, Q' denotes an organic group having olefinic unsaturation, a has a value of from 1 to 2 and b has a value of from 0 to 3, and at least 80% of the Q groups are methyl groups, (B) an organohydrogen polysiloxane having on average at least two silicon-bonded hydrogen atoms per molecule, any remaining substituents of the silicon atoms being a monovalent hydrocarbon group having no more than 8 carbon atoms, at least 50% of said remaining substituents being methyl groups, (C) a catalyst selected from, the group consisting of metals from group VIII of the Periodic Table and compounds of said metals between (A) and (B), and (D) an organosilane having the general formula

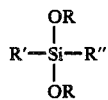

where R is a monovalent hydrocarbon group, having no more than 8 carbon atoms and which may contain ether oxygen atoms, R' is chosen from the group consisting of a hydrocarbon and hydrocarbonoxy groups containing from 2 to 5 carbon atoms and aliphatic unsaturation, and R" represents an epoxy-substituted group selected from monovalent hydrocarbon groups, hydrocarbonoxy groups, halogenated hydrocarbonoxy groups, hydrocarbon groups containing oxygen in the form of a hydroxyl group, a hydrocarbonoxy group containing oxygen in the form of an ether linkage or hydrocarbonoxy groups containing oxygen in the form of a hydroxyl group.

2. An organopolysiloxane composition according to claim 1 which also comprises a reinforcing silica filler.

3. An organopolysiloxane composition according to claim 1 wherein in polyorganosiloxane (A) Q' is vinyl.

4. An organopolysiloxane composition according to claim 1 wherein polyorganosiloxane (A) has only two Q' groups, each of which is present in an end-blocking triorganosiloxy group.

5. An organopolysiloxane composition according to claim 1 wherein organohydrogensiloxane (B) has on average at least 5 silicon-bonded hydrogen atoms per molecule.

6. An organopolysiloxane composition according to claim 1 wherein component (C) is as platinum compound.

7. An organopolysiloxane composition according to claim 6 wherein component (C) is a complex of said platinum compound and a vinylsiloxane.

8. An organopolysiloxane composition according to claim 1 wherein in component (D) R is selected from the group consisting of methyl and methoxyethyl.

9. An organopolysiloxane composition according to claim 1 wherein in component (D) R" is selected from the group consisting of

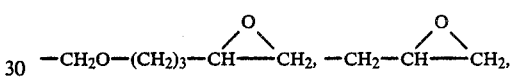

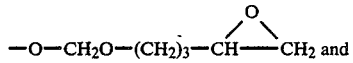

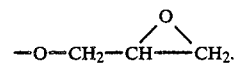

10. An organopolysiloxane composition according to claim 1 wherein component (D) is present in a proportion of from 0.5 to 2 percent by weight based on the weight of the total organopolysiloxane composition.

* * * * *